US012156609B2

(12) United States Patent
Godfrey et al.

(10) Patent No.: US 12,156,609 B2
(45) Date of Patent: Dec. 3, 2024

(54) METHOD AND APPARATUS FOR ADJUSTING BREW PARAMETERS DURING DISPENSING

(71) Applicant: Keurig Green Mountain, Inc., Burlington, MA (US)

(72) Inventors: Christopher Godfrey, Rowley, MA (US); Joseph George Fucci, Amherst, NH (US); James E. Shepard, Marblehead, MA (US); Gregory Franco, Billerica, MA (US)

(73) Assignee: Keurig Green Mountain, Inc., Burlington, MA (US)

( * ) Notice: Subject to any disclaimer, the term of this patent is extended or adjusted under 35 U.S.C. 154(b) by 1055 days.

(21) Appl. No.: 16/642,650

(22) PCT Filed: Sep. 4, 2018

(86) PCT No.: PCT/US2018/049343
§ 371 (c)(1),
(2) Date: Feb. 27, 2020

(87) PCT Pub. No.: WO2019/050834
PCT Pub. Date: Mar. 14, 2019

(65) Prior Publication Data
US 2020/0253414 A1 Aug. 13, 2020

Related U.S. Application Data

(60) Provisional application No. 62/554,159, filed on Sep. 5, 2017.

(51) Int. Cl.
*A47J 31/52* (2006.01)
*A47J 31/41* (2006.01)
(Continued)

(52) U.S. Cl.
CPC ............ *A47J 31/469* (2018.08); *A47J 31/41* (2013.01); *A47J 31/525* (2018.08);
(Continued)

(58) Field of Classification Search
CPC .... A47J 31/002; A47J 31/525; A47J 31/5251; A47J 31/5253; A47J 31/5255
See application file for complete search history.

(56) References Cited

U.S. PATENT DOCUMENTS 9,149,152 B2 * 10/2015 Cahen ................... A47J 31/52
9,717,366 B2   8/2017 Nevin et al.
(Continued)

FOREIGN PATENT DOCUMENTS

WO   WO 2014/143589 A1   9/2014
WO   WO 2014/164086 A1   10/2014

OTHER PUBLICATIONS

International Search Report and Written Opinion mailed Dec. 27, 2018 in connection with International Application No. PCT/US2018/049343.
(Continued)

*Primary Examiner* — Reginald Alexander
(74) *Attorney, Agent, or Firm* — Wolf, Greenfield & Sacks, P.C.

(57) ABSTRACT

A beverage forming method and system arranged to allow a user to change one or more brew parameters used by a beverage machine control circuit to perform automatic control during a beverage dispensing operation. For example, a user can adjust a volume of a beverage to be dispensed while the beverage is being dispensed in the user's cup, and the control circuit will adjust automatic control of the dispensing process based on the adjusted volume from the user.

11 Claims, 3 Drawing Sheets

(51) Int. Cl.
    *A47J 31/46*     (2006.01)
    *A47J 31/00*     (2006.01)
    *A47J 31/40*     (2006.01)
    *A47J 31/56*     (2006.01)

(52) U.S. Cl.
    CPC .......... *A47J 31/5255* (2018.08); *A47J 31/002* (2013.01); *A47J 31/407* (2013.01); *A47J 31/5253* (2018.08); *A47J 31/56* (2013.01)

(56) References Cited

U.S. PATENT DOCUMENTS

| | | | |
|---|---|---|---|
| 2002/0129712 A1* | 9/2002 | Westbrook | A47J 31/44 99/302 R |
| 2011/0315711 A1* | 12/2011 | Hecht | B67D 1/0895 222/144.5 |
| 2014/0263397 A1 | 9/2014 | Jacobs | |
| 2014/0272025 A1* | 9/2014 | Wheeler | A47J 31/469 99/283 |
| 2018/0192812 A1* | 7/2018 | Duvall | A47J 31/0615 |
| 2018/0303283 A1* | 10/2018 | Kollep | A47J 31/5255 |

OTHER PUBLICATIONS

International Preliminary Report on Patentability mailed Mar. 19, 2020 in connection with International Application No. PCT/US2018/049343.

PCT/US2018/049343, Dec. 27, 2018, International Search Report and Written Opinion.

PCT/US2018/049343, Mar. 19, 2020, International Preliminary Report on Patentability.

* cited by examiner

METHOD AND APPARATUS FOR ADJUSTING BREW PARAMETERS DURING DISPENSING

CROSS-REFERENCE TO RELATED APPLICATIONS

This application is a national stage filing under 35 U.S.C. § 371 of International Patent Application No. PCT/US2018/049343, filed Sep. 4, 2018, which claims the benefit under 35 U.S.C. § 119 (e) of U.S. Provisional Patent Application No. 62/554,159, filed Sep. 5, 2017, each of which are hereby incorporated by reference in their entireties.

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Patent Application publication 2008/0134902 discloses a beverage forming system that heats water in a reservoir and pneumatically delivers the heated water to a brew chamber for making a coffee drink or other beverage. U.S. Pat. No. 7,398,726 discloses another beverage forming system that delivers heated water from a dispensing tank to a brew chamber by pneumatic forcing of the water from the metering tank. U.S. Patent Application publications 2009/0120299 and 2008/0092746, and U.S. Pat. Nos. 3,511,166, 3,958,502, 4,602,145, 4,263,498 and 8,037,811 disclose other system types in which water in a heater tank or heat exchanger is forced to flow out of the tank and to a beverage making station by introducing unheated water into the tank/exchanger.

SUMMARY OF INVENTION

Some aspects of the invention relate to arrangements for allowing a user to adjust one or more brew parameters during an automated dispensing operation. For example, in some embodiments a user may initially select a particular beverage volume, such as 8 ounces, prior to initiating a brew cycle, and then change the dispensed volume to something different, such as 6 ounces or 12 ounces, while the beverage is being dispensed. This is in contrast to other automated brewing systems that allow a user to select a beverage volume prior to initiating the brew cycle, but once the brew cycle is started the user has no ability to make any change to the dispensed volume. Instead, if a user would like a smaller volume, the user must remove a cup or other container from the dispensing outlet prior to completion of the dispensing process (allowing remaining dispensed beverage to dump into a drip tray or other container), or if a larger volume is desired, the user must run a second brew cycle. Aspects of the invention allow a user to make a change to a dispensed volume of a beverage during the dispensing volume, and/or can allow the user to make changes to other brew parameters during a dispensing operation, such as beverage strength, dispense time, brew temperature, air purge (or not), and others.

In one aspect of the invention, a beverage forming system includes a liquid supply arranged to provide a liquid for forming a beverage. As an example, a liquid supply may include a water storage tank or reservoir, a pump to move water, conduits to carry the flow of water or other liquid, flow meters and/or other sensors to detect liquid, valves for controlling flow, etc. A brew chamber may be arranged to hold a beverage material for mixing with the liquid to form a beverage, e.g., the brew chamber may hold a beverage cartridge that contains a beverage material such as coffee grounds that form a coffee beverage when mixed with water. A liquid conditioner may be arranged to heat or cool the liquid that is provided to the brew chamber, e.g., may include a heater tank or inline heater including an electrical resistance heater, or a refrigeration system arranged to cool a liquid. A control circuit may be arranged to control the liquid supply and the liquid conditioner to operate automatically according to one or more brew parameters during a dispensing operation to deliver heated or cooled liquid to the brew chamber to form the beverage. For example, the control circuit may set a beverage volume and temperature prior to beginning a dispensing operation, and then automatically control portions of the beverage system to operate according to the set brew parameters once the dispensing operation begins. However, the control circuit may be arranged to change at least one of the brew parameters based on user input during the dispensing operation and to cause the liquid supply or liquid conditioner to change operation based on the changed at least one brew parameter. For example, a user may change a desired beverage volume and/or temperature while the beverage is being dispensed, and the control circuit may adjust an amount of liquid delivered to the brew chamber and/or the temperature of the liquid to accommodate the changed brew parameters. The user may provide information to the control circuit to change a brew parameter via a user interface, which may include one or more buttons, touch screen icons or other elements, or other interface devices that are associated with one or more brew parameters. For example, the user interface may include a plurality of buttons, each of the plurality of buttons associated with a corresponding beverage volume and being actuatable by a user to provide the user input. In another example, the user interface includes a button to define a flow rate of liquid delivered to the brew chamber during beverage formation, and the button is acuatable by a user to provide the user input.

In some embodiments, the one or more brew parameters includes a volume of beverage dispensed during the dispensing operation, a temperature of the beverage, an amount of whipping of the beverage, a time period over which the beverage is dispensed, a speed at which the beverage is dispensed, a flow rate at which liquid is delivered to the brew chamber, a pressure of liquid delivered to the brew chamber, and an amount of air or steam delivered to purge the brew chamber. For example, the one or more brew parameters may include a beverage volume, and the control circuit may be arranged to change the beverage volume based on user input during the dispensing operation and to cause the liquid supply to adjust an amount of liquid delivered to the brew chamber based on the changed beverage volume. As mentioned above, the control circuit may be arranged to change the beverage volume based on user input received while beverage is being dispensed from the brew chamber, or otherwise during a dispensing operation or brew cycle, e.g., after a user presses a "brew cycle start" button. Beverage volume adjustments may be executed in different ways, e.g., where the liquid supply includes a pump, the control circuit may be arranged to control a number of pump revolutions turned by the pump to adjust the amount of liquid delivered to the brew chamber.

As another example, the one or more brew parameters may include a flow rate at which liquid is delivered to the brew chamber, and the control circuit may be arranged to change the flow rate based on user input during the dispensing operation and to cause the liquid supply to adjust a flow rate based on the changed flow rate. For example, where the liquid supply includes a pump, the control circuit may be arranged to control a rotary speed of the pump to adjust the flow rate of liquid delivered to the brew chamber. The flow rate may be adjusted by controlling the pump to operate on an intermittent basis or to operate more slowly (or faster). In one embodiment, the pump may be a positive displacement pump controllable by the control circuit to deliver a known volume of liquid to the heater tank.

The beverage forming system may include a liquid supply that is arranged in any suitable way to deliver liquid to the heater tank. For example, the liquid supply may include a storage tank fluidly coupled to an inlet of a pump, which has a fluid outlet fluidly coupled to the liquid inlet of the heater tank. Thus, the pump may be used to move water from the storage tank and into the heater tank to cause liquid discharge at the tank outlet. In one embodiment, the pump is a positive displacement pump, such as a syringe or diaphragm pump, controllable to deliver a known volume of liquid to the heater tank. For example, a diaphragm pump may be arranged so that a known volume of liquid, e.g., 5 ml of water, is delivered for each delivery stroke. As a result, by operating the pump through a desired number of cycles, a known volume of water or other liquid may be delivered to the tank, and thus from the tank to a brew chamber or other outlet.

In some embodiments, the brew chamber may be arranged to hold a beverage cartridge that contains a beverage medium, and the outlet of the heater tank may be fluidly coupled to an inlet of the brew chamber so that liquid is introduced into the beverage cartridge to form a beverage. For example, the inlet of the brew chamber may include a piercing element, such as a hollow needle, arranged to pierce a portion of the cartridge to form an opening through which liquid is delivered. Other arrangements are possible for introducing liquid to a beverage medium, such as having the beverage medium held in the brew chamber as is done in some drip coffee brewing systems. Thus, aspects of the invention are not necessarily restricted to cartridge-based beverage forming systems, but can be used in any suitable system type, including systems that dispense heated water only.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiment and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
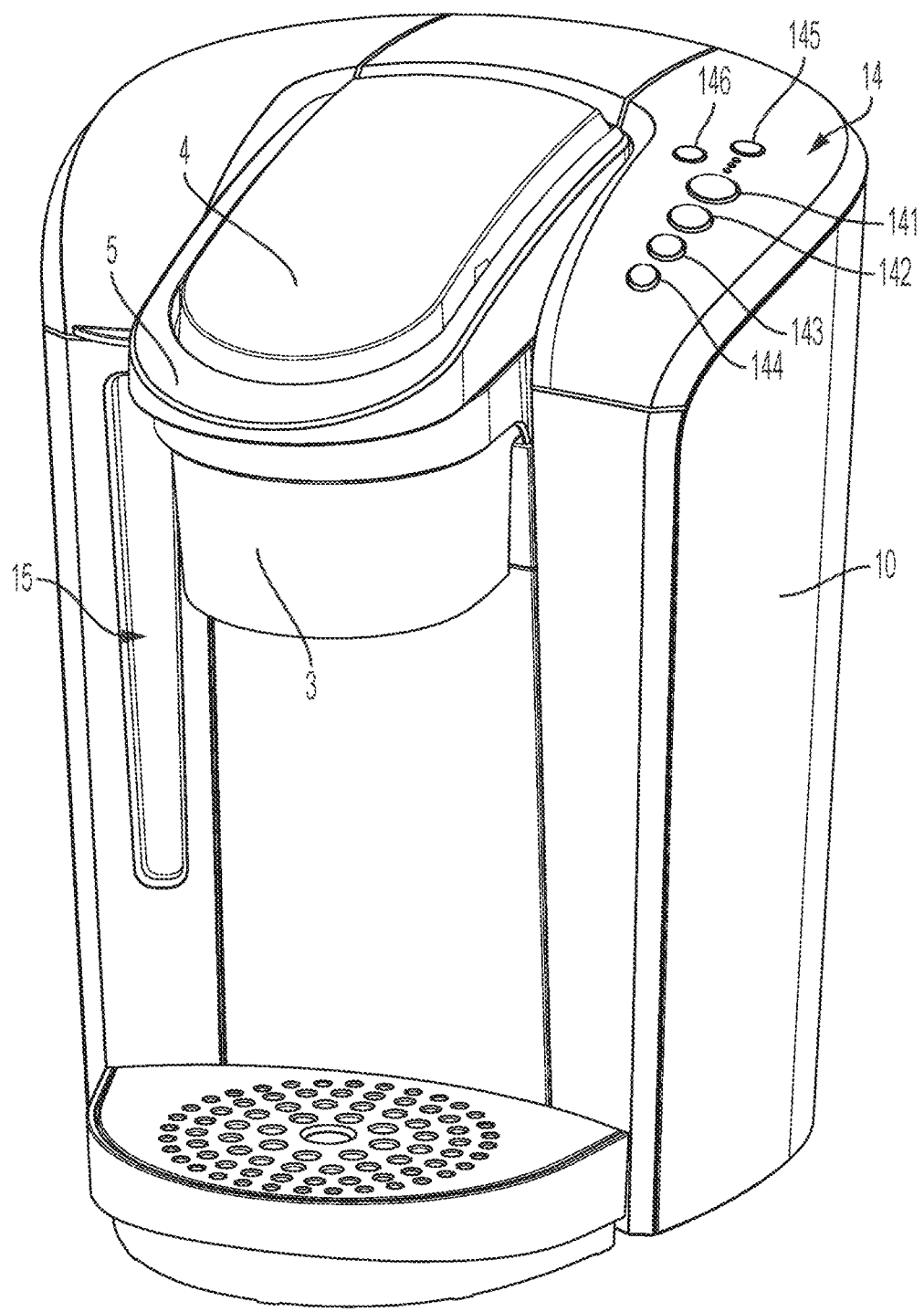
FIG. 1 is a right side perspective view of a beverage forming system in an illustrative embodiment.
Figure 2:
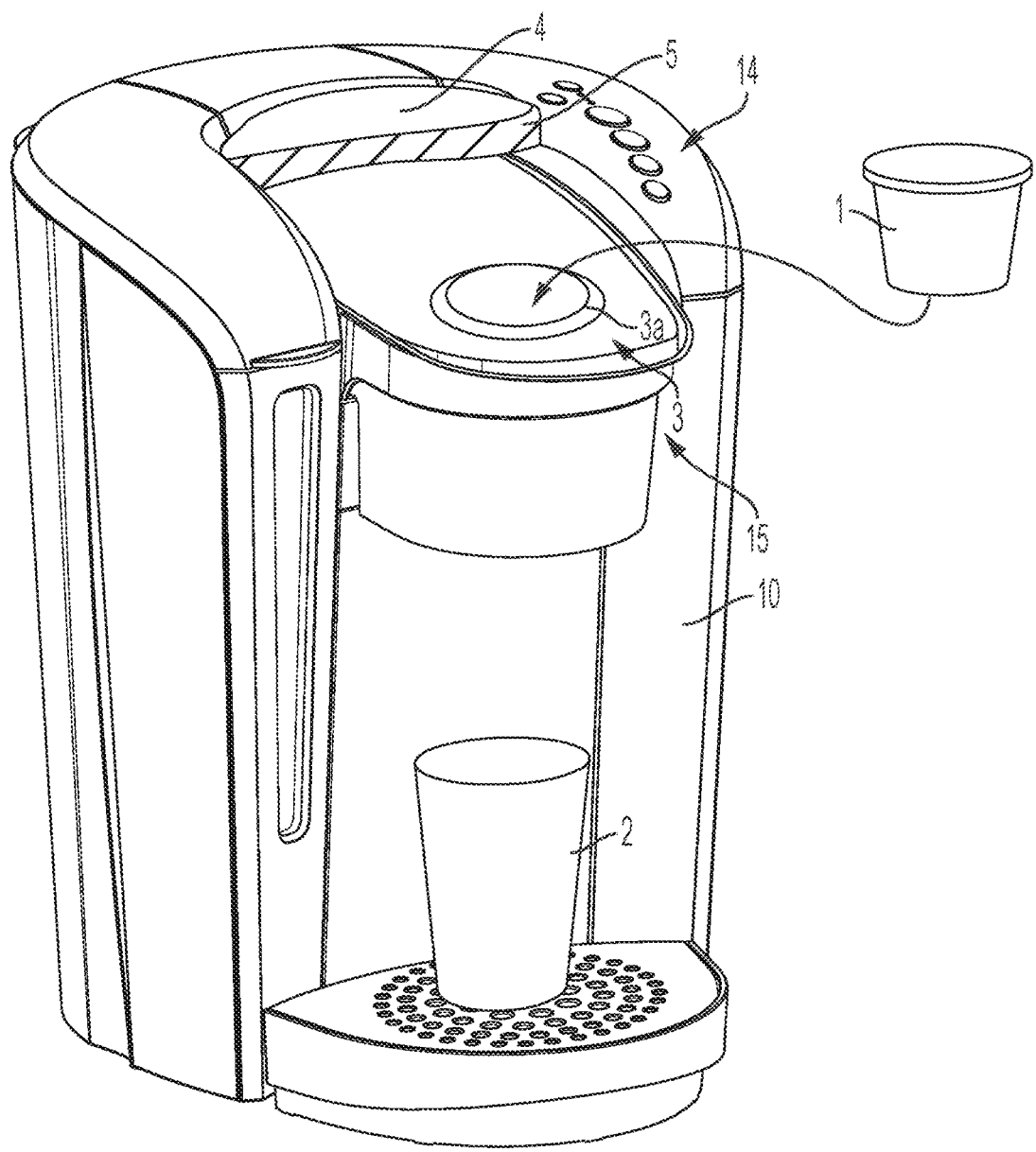
FIG. 2 is a left side perspective view of the beverage forming system with a cartridge holder in an open position.

FIGS. 1 and 2 show perspective views of a beverage forming system 100. Although the beverage forming system 100 may be used to form any suitable beverage, such as tea, coffee, other infusion-type beverages, beverages formed from a liquid or powdered concentrate, soups, juices or other beverages made from dried materials, or other, in this illustrative embodiment, the system 100 is arranged to form coffee or tea beverages. As is known in the art, a beverage cartridge 1 may be provided to the system 100 and used to form a beverage that is deposited into a user's cup or other suitable container 2. The cartridge 1 may be manually or automatically placed in a brew chamber 15 that includes a cartridge holder 3 and cover 4 of the beverage forming system 100. For example, the holder 3 may be or include a circular, cup-shaped or otherwise suitably shaped opening 3a in which the cartridge 1 may be placed. In this embodiment, the cartridge holder 3 includes an opening 3a that is arranged to receive the cartridge 1. With a cartridge 1 placed in the cartridge holder 3, a handle 5 may be moved by hand (e.g., downwardly) so as to move the cover 4 to a closed position (as shown in FIG. 1). In the closed position, the cover 4 at least partially covers the opening 3a, e.g., to at least partially enclose the cartridge 1 in a space in which the cartridge is used to make a beverage. For example, with the cartridge 1 held by the cartridge holder 3 in the closed position, water or other liquid may be provided to the cartridge 1 (e.g., by injecting the liquid into the cartridge interior) to form a beverage that exits the cartridge 1 and is provided to a cup 2 or other container. Of course, aspects of the invention may be employed with any suitably arranged system 100, including drip-type coffee brewers, carbonated beverage machines, and other systems that deliver water from a tank. Thus, a cartridge 1 need not necessarily be used, but instead the brew chamber may accept loose coffee grounds or other beverage material to make a beverage. Also, the brew chamber 15 need not necessarily include a cartridge holder 3 and a cover 4. For example, the brew chamber may include a filter basket that is accessible to provide beverage material, and the filter basket itself may be movable, e.g., by sliding engagement with the beverage machine 10 housing, and a cover 4 may be fixed in place. In other embodiments, the brew chamber need not be user accessible, but instead beverage material may be automatically provided to, and removed from, the brew chamber. Accordingly, a wide variety of different types and configurations for a brew chamber may be employed with aspects of the invention.

In accordance with an aspect of the invention, a user may be able to change one or more brew parameters used to form a beverage by the beverage machine while a beverage is being dispensed. This is in contrast to existing machines that set brew parameters prior to starting beverage dispensing, and then use those parameters without any ability to change the parameters throughout the dispensing process. For example, coffee brewers typically require a user to select a desired beverage volume, beverage temperature, beverage strength, or other parameters prior to starting beverage dispensing. With the parameters set, the coffee brewer will proceed to beverage dispensing without allowing for any change to the brew parameters. In embodiments according to aspects of the invention, a user can change one or more brew parameters during dispensing. This may allow a user to change the volume of a dispensed beverage, for example, after dispensing has started. If a user initially selected a beverage volume of 10 ounces, a beverage machine according to at least one embodiment may allow the user to change the beverage volume to something else, such as 8 ounces or 12 ounces, while beverage is being dispensed. While beverage volume is used extensively in this description as one example of a parameter that may be changed during dispensing, other parameters such as beverage temperature (including a temperature of water or other precursor liquid supplied to a brew chamber), beverage frothing or whipping (or not), beverage dispense time or speed, precursor liquid flow rate, precursor liquid pressure (including steam pressure), beverage chilling (or not), brew chamber air or steam purge (or not), beverage dispensing control (including opening and closing a dispense valve), beverage material pre-wet (or not) or pulse-type brewing, and other parameters may be adjusted during dispensing.

In the illustrative embodiment of FIGS. 1 and 2, the beverage machine 10 includes a user interface 14 that can display information to, and receive commands or other information from, a user (e.g., via light display, button illumination color or pattern, an alphanumeric text or graphics display, touch screen, etc.). In this illustrative embodiment, the user interface 14 includes four buttons that a user can press to select a beverage volume, 12 oz. button 141, 10 oz. button 142, 8 oz. button 143, and 6 oz. button 144. (It cannot be stressed enough that this and other examples are merely that—examples to illustrate aspects of the invention in one embodiment. The particular buttons in this embodiment may be associated with other beverage volumes or other brew parameters such as those identified above. Also, other user interface devices than buttons may be employed by the user interface 14 to receive user input on beverage volume or any other parameter.)

In preparation for brewing a beverage, a user may place beverage material (e.g., in a single-use or reusable cartridge 1) in the brew chamber 15 (formed by the cartridge holder 3 and the cover 4 in this embodiment), close the brew chamber 15 (if required) and press one of the buttons 141-144 to select a desired beverage volume (e.g., button 141 to select a 12 ounce beverage). Upon pressing one of the buttons 141-144, the beverage machine 10 may start an automated beverage dispensing operation that requires no further input from a user to complete, which may include heating water in a hot water tank to a desired level, and then delivering the heated water or other precursor liquid to the brew chamber 15 to mix with the beverage material and form a beverage that is dispensed into the user's cup 2. In some other embodiments, after selecting a desired beverage volume by pressing one of the buttons 141-144, the user may have to press another button, such as a "start" button 145, to cause the beverage machine to start the beverage dispensing process (or brew cycle). For example, after one of the buttons 141-144 is pressed to select a beverage volume, the button 145 may flash indicating that the user must press the button 145 to start the automated dispensing operation. After the dispensing operation is started, a user may change the defined beverage volume by pressing another one of the buttons 141-144, e.g., change the beverage volume from 12 ounces to 8 ounces by pressing the 8 oz. button 143. In response, the beverage machine 10 may adjust the amount of precursor liquid delivered to the brew chamber 15 to effect the adjusted beverage volume.

Exactly how the beverage machine 10 adjusts operation to effect the adjusted beverage volume provided during the automated dispensing operation may depend on the liquid precursor supply components (such as pumps, flow meters, etc.) that the beverage machine 10 includes, as well as other conditions. For example, if the beverage machine 10 employs a pump and flow meter to detect an amount of precursor liquid delivered by the pump to the brew chamber 15, the beverage machine 10 may simply change the flow meter-detected volume at which the pump is shut down to stop liquid delivery. If the beverage machine 10 operates by filling a hot water tank to a selected beverage volume and then delivering the volume to the brew chamber 15, the beverage machine 10 may add more liquid to the tank (in the case of an increase in selected volume) or remove liquid from the tank or deliver less of the liquid in the tank (in the case of a decrease in selected volume). In other embodiments, the beverage machine 10 may include an outlet valve that can stop dispensing to a user's cup when an adjusted volume of beverage has been dispensed. In cases where additional beverage is produced, but not desired based on the user's changed beverage volume, the outlet valve may divert additional unwanted beverage to a drip tray or waste tank rather than delivering the beverage to the user's cup. Other details regarding system control for different embodiments are provided below.

As mentioned above, other brew parameters may be adjusted by a user during an automated dispensing operation, including while beverage is being dispensed in a user's cup. A user may adjust a temperature of the beverage during a dispensing process, e.g., to stop further heating or cooling of liquid used to form a beverage and/or to cause the beverage machine to heat or cool the beverage after it is formed by mixing of liquid with a beverage material. As an example, hot water may be mixed with coffee grounds to form a hot coffee beverage, which may be dispensed. During a dispensing operation, a user may adjust the beverage temperature to indicate that a chilled coffee beverage should be dispensed, and in response the control circuit may cause the hot coffee beverage to be chilled (e.g., by flowing over evaporator coils of a refrigeration system) before dispensing. In another embodiment, a user may adjust a beverage temperature from e.g., 197 degrees Fahrenheit to 192 degrees Fahrenheit during a dispensing operation, and the control circuit may control a flow rate of liquid and/or a heating element (e.g., in thermal communication with water in a heater tank or an in-line heater) used to heat the liquid to achieve the adjusted beverage temperature. In some cases, where beverage has already been dispensed into a user's cup, the control circuit may calculate a remaining amount of beverage to be dispensed and a suitable temperature of the beverage remaining to be dispensed so that the final temperature of beverage in the user's cup is at or near the adjusted temperature set by the user.

In embodiments where a user can adjust an amount of whipping of a beverage, the beverage machine may include a whipping element (e.g., a motor driven blade or blades to agitate the beverage to introduce air or other gas into the beverage) to froth or foam beverage while the beverage is being dispensed from the brew chamber or after dispensing. The control circuit may be arranged to automatically control the whipping element to operate in at least some automated dispensing operations, e.g., while dispensing a hot milk beverage used to form a cappuccino or latte beverage. However, the user may provide input to the control circuit, such as by pressing a button or issuing a voice command, to terminate or start whipping at any point in the dispensing process. For example, a user may determine that no whipping of a milk beverage is desired at all and thus prevent any whipping. Or the user may determine that an amount of froth produced is sufficient and stop whipping prematurely in relation to when whipping would stop under automatic control. Similarly, the control circuit may typically not operate the whipping element in some processes, such as dispensing hot coffee, but a user may cause the control circuit to operate the whipping element after the dispensing operation has begin to whip hot coffee if desired.

In embodiments where a user can adjust a time period over which the beverage is dispensed, the beverage machine may be arranged to stop, slow or speed beverage dispensing based on the user's input. For example, the beverage machine may include a valve at an outlet of the brew chamber that can be closed by the control circuit so as to prolong a dispensing time. In other embodiments, the control circuit may slow or speed a rate at which liquid is delivered to a brew chamber, or may adjust a size of a dispensing opening from the brew chamber to adjust the time period over which beverage is dispensed.

In embodiments where a user can adjust a flow rate at which liquid is delivered to the brew chamber, the beverage machine may adjust a speed of operation of a pump that delivers liquid to the brew chamber, may adjust a size of a throttling valve opening or other flow controller to adjust the liquid flow rate, may adjust a pressure or flow rate of air used to move liquid to the brew chamber (e.g., by adjusting a speed of operation of an air pump), and/or other techniques.

In embodiments where a user can adjust a pressure of liquid delivered to the brew chamber, the beverage machine may cause a pump to operate at a higher pressure when delivering the liquid to the brew chamber, close or otherwise adjust a size of a dispensing opening from the brew chamber to cause a back pressure to build up in the brew chamber, adjust a temperature in a boiler so as to increase or decrease a steam pressure in the boiler used to move liquid to the brew chamber, control whether or how pressure is vented from the brew chamber, or other techniques.

In embodiments where a user can adjust an amount of air or steam delivered to purge the brew chamber, the beverage machine may cause an air pump or liquid heater to operate or not depending on whether a user indicates whether a purge should occur. For example, in the case of an air purge, a user may press a button or otherwise provide input to the control circuit after a dispensing operation has begun that causes the control circuit to run an air pump that delivers air to the brew chamber. Thus, an air purge may be employed where normal automatic operation would not cause an air purge to occur, and vice versa. In the case of a steam purge, user input may cause a heater to operate (or not) to create steam that is forced through the brew chamber.

Figure 3:
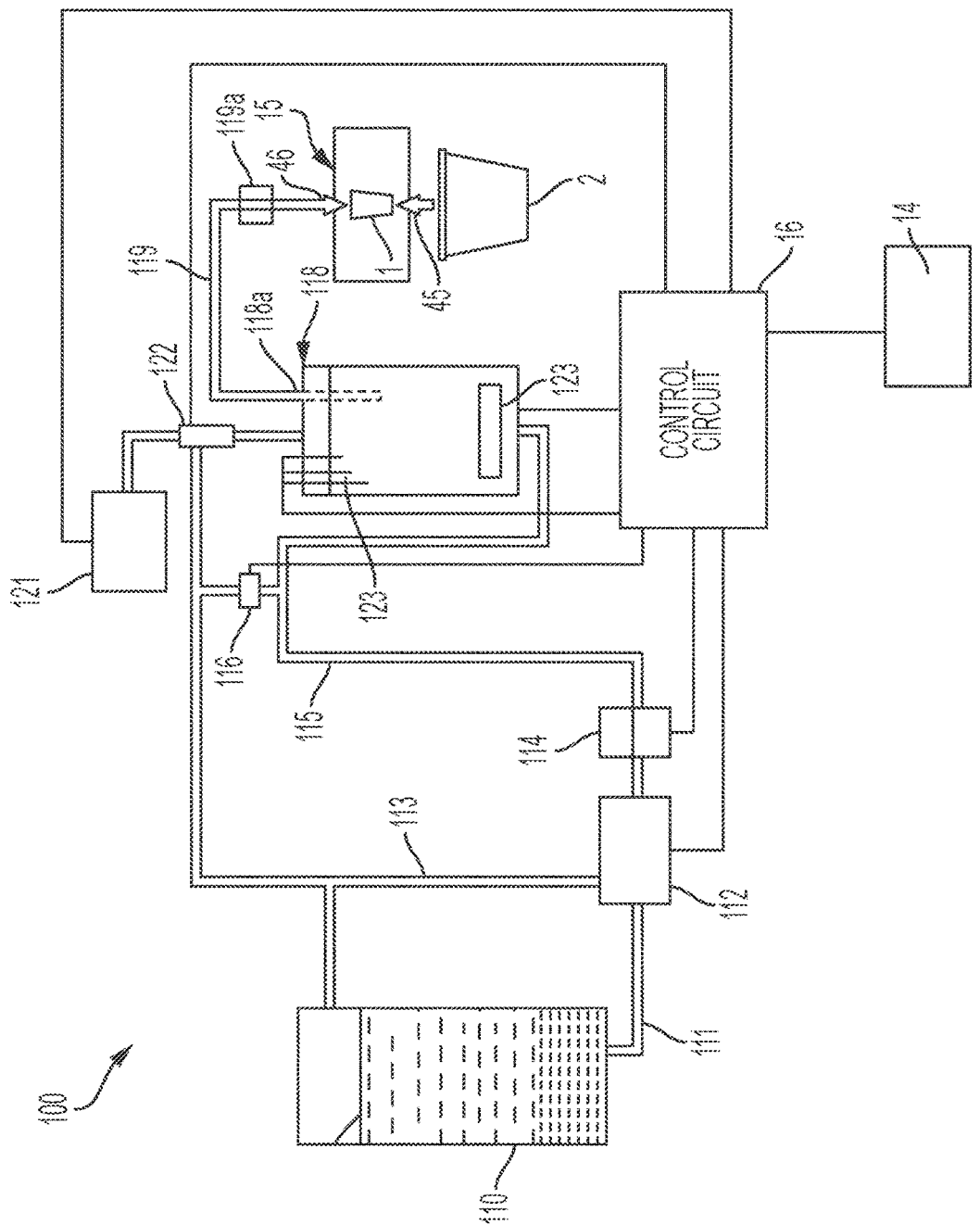
FIG. 3 shows a schematic diagram of functional components of the beverage forming system in an illustrative embodiment.

FIG. 3 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. Water or other liquid may be provided to a cartridge 1 in a brew chamber 15 (in FIGS. 1 and 2 including the cartridge holder 3 and cover 4) or to another beverage outlet by a liquid supply that, in this embodiment includes a storage tank 110, a supply conduit 111 fluidly connecting the storage tank 110 to an inlet of a pump 112 (such as a centrifugal pump, piston pump, solenoid pump, diaphragm pump, etc.), and a pump conduit 115 that is fluidly connected between the outlet of the pump 112 and a liquid inlet of the heater tank 118. This embodiment includes other optional features, such as a check valve 114 or other flow controller (such as an electronically-controlled valve) that can prevent backflow in the pump conduit 115 from the tank 118 to the pump 112, an optional pump conduit vent 116, which may include a controllable valve or fixed orifice, that allows a siphon in the pump conduit 115 to be broken as necessary, or a pressure relief valve that may open to vent the pump conduit 115 in the case of pressure over a threshold level. A priming conduit 113 may be fluidly connected to the pump 112 to allow the pump 112 to be primed by venting the pump 112. In other arrangements, the conduit 113 may provide air to the pump 112 to allow the pump 112 to pump air through the conduit 115 and to the heater tank 118, e.g., to purge the conduit 115, heater tank 118 and/or other conduits downstream of the heater tank 118. In such a case, the conduit 113 may include a valve that can be opened to permit air flow to the pump 112, and/or a valve to control water flow from the storage tank 110.

Operation of the water pump 112 and other components of the apparatus 100 may be controlled by a control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces (such as a user interface 14), communication buses or other links, a display, switches, relays, triacs, or other components necessary to perform desired input/output or other functions. As discussed above, the user interface 14 may be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on.

The heater tank 118 may be provided with a desired amount of liquid by any suitable technique, such as running the pump 112 for a predetermined time, detecting a flow rate or volume of liquid passing through the pump conduit 115 (e.g., at the flow controller 114 which may include a flow meter), operating the pump 112 for a desired number of cycles (such as where the pump is arranged to deliver a known volume of liquid for each cycle, such as for each revolution of a pump shaft), or using any other viable technique. At an initial operation or filling of the heater tank 118, the control circuit 16 may detect that the heater tank 118 is completely filled when a pressure sensor (not shown) detects a rise in pressure indicating that the water has reached the top of the heater tank 118, when a conductive probe 123 detects the presence of liquid in an upper portion of the tank 118, when an optical sensor detects a presence of liquid in the tank conduit 119, and others. Alternately, the control circuit 16 may not detect whether the tank 118 is filled or not, and simply assume that the tank 118 is filled once a first fill operation is completed, e.g., by operating the pump 112 for a time or number of cycles that is known to fill the tank 118.

Water in the tank 118 may be heated by way of a heating element 123 whose operation is controlled by the control circuit 16 using input from a temperature sensor or other suitable input. Water in the heater tank 118 may be dispensed via the heater tank conduit 119 to the brew chamber 15 or other beverage forming station or outlet. Liquid may be discharged from the heater tank 118 by the pump 112 operating to force additional unheated liquid into the tank 118, thereby displacing water out of the tank 118 and to the brew chamber 15. A flow sensor or other suitable device may be used to determine the amount of liquid delivered to the tank 118, and thus the amount of liquid delivered to the brew chamber 15. Alternately, the pump 112 may be a piston-type, diaphragm-type or other pump arranged such that a known volume of liquid may be delivered from the pump 112 to the tank 118, thus causing the same known volume to be delivered to the brew chamber 15. Thus, a specified volume of liquid may be delivered to the brew chamber 15 by operating the pump 112 to deliver the specified volume of liquid to the tank 118, e.g., a diaphragm pump may deliver 5 ml for each pump stroke, and thus 100 ml of liquid may be delivered to the tank 118 by operating the pump through 20 pump cycles (e.g., pump strokes or revolutions of a pump shaft). Liquid may be introduced into the cartridge 1 at any suitable pressure, e.g., 1-2 psi or higher, and the pressure may be adjustable by the control circuit 16. Although in this embodiment the tank conduit 119 is shown as connected simply to the top of the tank 118 at an outlet of the tank 118 without extending into the tank at all, the conduit 119 could be arranged in other suitable ways. The outlet of the heater tank 118 could be arranged at an extreme top of the tank 118, or in other ways in other embodiments, e.g., at the top of the tank 118 but below the extreme top portion of the tank 118, or at a location between the top and bottom of the tank 118 such as where the air pump 121 is used to move water from the tank 118 to the brew chamber 15 like that shown in FIG. 1 of U.S. Pat. No. 7,398,726. The tank conduit 119 may include a check valve 119a, solenoid valve or other flow controller, e.g., to help prevent backflow in the tank conduit 119 from the brew chamber 15 to the tank 118 and/or to prevent flow from the tank 118 to the brew chamber 15.

The brew chamber 15 may include any beverage making ingredient or material, such as ground coffee, tea, a flavored drink mix, or other beverage medium, e.g., contained in a cartridge 1 or not. Alternately, the brew chamber 15 may function simply as an outlet for heated water, e.g., where a beverage medium is contained in a user's cup 2. Once liquid delivery by the pump 112 to the tank 118 is complete, an air pump 121 may be operated to force air into the top of the tank 118 and/or into the conduit 119 to purge a top portion of the tank 118, the conduit 119 and/or cartridge 1 of liquid, at least to some extent. A valve 122 may be used to control air flow into and/or out of the tank 118.

While in this illustrative embodiment, a liquid supply system arranged to provide liquid to a beverage outlet (at the brew chamber 15) may include a pump 112, storage tank 110 and other components, these components are not necessarily required and/or other components may be included. For example, a check valve 114, flow meter, vent valve 116 (e.g., to help prevent the formation of a siphon), etc., may or may not be included with the liquid supply. Alternately, other mechanisms for providing liquid may be used, such as by gravity flow of liquid, flow forced by air pressure, or other motive force to move liquid from a storage tank 110, flow of liquid from a plumbed or other "city water" supply, and others.

For those systems employing a cartridge 1, once a cartridge is located in the brew chamber 15 in the closed position, the beverage forming system 100 may use the cartridge 1 to form a beverage. For example, one or more inlet needles 46 associated with the cover 4 or other part of the system 100 may pierce the cartridge 1 (e.g., a lid of the cartridge) so as to inject heated water or other liquid into the cartridge 1. The injected liquid may form the desired beverage or a beverage precursor by mixing with beverage material in the cartridge 1. The cover 4, cartridge holder 3 or other portion of the system 100 may also include one or more outlet needles 45 or other elements to puncture or pierce the cartridge 1 at an outlet side to permit the formed beverage to exit the cartridge 1. Other inlet/outlet piercing arrangements are possible, such as multiple needles, a shower head, a non-hollow needle, a cone, a pyramid, a knife, a blade, etc. In another arrangement, a beverage machine may include a piercing element (such as a spike) that forms an opening and thereafter a second inlet element (such as a tube) may pass through the formed hole to introduce liquid into (or conduct liquid out of) the container. In other embodiments, a lid or other portion of a cartridge may be pierced, or otherwise effectively opened for flow, by introducing pressure at an exterior of the lid. For example, a water inlet may be pressed and sealed to the lid exterior and water pressure introduced at the site. The water pressure may cause the lid to be pierced or otherwise opened to allow flow into the cartridge 1. In another arrangement, the cartridge lid may include a valve, conduit or other structure that opens when exposed to a suitable pressure and/or when mated with a water inlet tube or other structure. As with the inlet piercing arrangement, the outlet piercing arrangement may be varied in any suitable way. Thus, the outlet piercing element 45 may include one or more hollow or solid needles, knives, blades, tubes, and so on. Alternately, the cartridge 1 may include a valve, septum or other element that opens to permit beverage to exit when liquid is introduced into the cartridge, but otherwise remains closed (e.g., to protect the beverage medium from external conditions such as oxygen, moisture or others). In such a case, no piercing element for forming the outlet opening is necessarily required although may be used, e.g., to allow the valve or other element to open. Also, in this illustrative embodiment the piercing element 45 remains in place to receive beverage as it exits the opening formed in the cartridge. However, in other embodiments, the piercing element 45 may withdraw after forming an opening, allowing beverage to exit the opening and be received without the piercing element 45 being extended into the cartridge 1. Other arrangements for a beverage outlet are possible however, e.g., the cartridge may have a permeable portion that allows beverage to exit cartridge 1. Also, there is no requirement that an inlet and/or an outlet pierce a cartridge to provide liquid to, or receive beverage from, a cartridge. Instead, communication with a cartridge may be performed using any suitable ports or other features.

With a beverage cartridge 1 provided in the brew chamber 15 or beverage material (if used) otherwise provided with the brew chamber 15, the control circuit 16 may operate in different ways to dispense a beverage. In some embodiments, the control circuit 16 may automatically select one or more brew parameters for automatically controlling the liquid supply and liquid conditioner portions to dispense a beverage during a dispensing operation. For example, the control circuit 16 may select default values for parameters such as a beverage volume, beverage temperature, whether beverage frothing or whipping will be employed, a beverage dispense time or speed, a precursor liquid flow rate, a precursor liquid pressure, whether beverage chilling will be employed, whether brew chamber air or steam purge will be employed, whether beverage material pre-wet or pulse-type brewing will be employed and if so time periods between liquid delivery, and others. Such parameters may be automatically determined in different ways, such as by reading parameter values from an information element (such as an RFID tag) on a cartridge 1, receiving input from a user via a user interface 14, by employing default values stored in a memory of the control circuit 16, and/or by a combination of such techniques or others. In some cases, the control circuit 16 may begin a dispensing operation once the brew parameter values are set, or in response to additional user input such as the user pressing a brew start button, e.g., the button 145 in FIG. 2. In one example, a user may press one of the beverage volume buttons 141-144 in FIG. 2 to select a beverage volume and then press a brew start button 145 to cause the control circuit 16 to start an automated dispensing operation. Other brew parameters such as beverage temperature, etc. may be automatically selected by the control circuit 16 using default values unless the user provides additional input to adjust those values.

The control circuit 16 may execute an automated dispensing operation (in this example in response to depression of the start button 145) in different ways since dispensing processes may include different steps which may be performed in series and/or in parallel. For example, in some embodiments the heater tank 118 may store a volume of pre-heated water such that the control circuit 16 may immediately control the pump 112 to deliver additional water to the tank 118, thereby causing the flow of heated water from the tank 118 to the brew chamber 15 at the start of a dispensing operation. In other embodiments, water in the heater tank 118 may first need to be heated, and thus the control circuit 16 may first cause the heating element 123 to heat water in the tank 118, and then automatically start water delivery once heating is complete. Of course, these steps are relevant to the illustrative embodiment in FIGS. 1-3, and other beverage machine 10 configurations may involve other steps at part of an automated dispensing operation. For example, if the beverage machine 10 employs an inline heater rather than a heater tank 118, the control circuit 16 may cause a heating element of the inline heater to begin heating and then simultaneously or shortly thereafter begin causing water flow through the inline heater and to the brew chamber. Where no pump is used by the beverage machine 10, water flow may be caused by gravity, steam pressure in an inline heater, or other.

With water or other liquid sufficiently heated in the heater tank 118, the control circuit 16 may continue with the automated process of beverage dispensing by causing the pump 112 to deliver liquid to the tank 118, thereby delivering heated liquid to the brew chamber 15. The control circuit 16 may sense or otherwise keep track of a volume of liquid delivered to the brew chamber 15 so that the selected beverage volume can be dispensed. For example, the control circuit 16 may cause the pump 112 to operate a specified number of cycles where a particular volume of liquid is delivered by the pump 112 for each pump cycle. Alternately, a flow meter may be used by the control circuit 16 to detect a volume of liquid delivered to the brew chamber 15, or other techniques.

In accordance with aspects of the invention, the control circuit 16 may be arranged to receive user input, e.g., via the user interface 14, to change one or more brew parameters while the control circuit 16 is executing an automated beverage dispensing operation. In response, the control circuit 16 may adjust operation of one or more portions of the liquid supply and/or liquid conditioner to account for the changed brew parameter(s). In this example, a user may depress one of the beverage volume buttons 141-144 to change the selected beverage volume during the automated dispensing operation. For example, the user may change the initially selected beverage volume of 12 ounces to 8 ounces. In response, the control circuit 16 may cause the pump 112 to deliver a volume of water to dispense a beverage of 8 ounces rather than the originally set 12 ounce volume. In cases where the user makes the change to beverage volume before the beverage machine 10 has actually dispensed 8 or more ounces, the control circuit 16 can simply adjust the liquid delivery to execute the 8 ounce beverage size. Where the beverage machine 10 has already dispensed more than 8 ounces when the user makes the beverage volume change to 8 ounces, the control circuit 16 may stop liquid delivery in an attempt to best comply with the changed beverage volume. The control circuit 16 may also display information regarding how much beverage was actually dispensed and/or provide an error message that indicates that the changed beverage volume could not be executed because of the late time of parameter change. Assuming the user has not made other changes to brew parameters, the control circuit 16 may continue with other automated aspects of the dispensing operation, such as beverage whipping, air purge of the brew chamber, etc.

Other liquid supply or liquid conditioner arrangements may require different techniques for complying with a user changed beverage volume during an automated beverage dispensing operation. For example, if the heater tank outlet 118*a* is located between the top and bottom of the tank 118 (e.g., as shown in dashed line in FIG. 3), liquid is not typically delivered to the brew chamber 15 by causing the pump 112 to deliver water to the tank 118 so as to force water to flow out of the tank into the conduit 119 and to the brew chamber 15. Instead, such systems typically fill the heater tank 118 to a desired level, e.g., as detected by one or more conductive probes 123 shown in FIG. 3 or other sensor arrangements, and once the heater tank 118 is filled to a desired level and the water heated, the air pump 121 is operated to force water to flow out of the outlet 118*a* and to the brew chamber 15. The volume of liquid delivered to the brew chamber is equal to the volume of liquid in the tank 118 that is between the outlet 118*a* and the fill level in the tank 118 at the start of water delivery. In this case, if a user increases the beverage volume during the dispensing operation, but before any liquid is delivered from the tank 118 (such as while liquid is being delivered by the pump 112 to the tank 118 or while liquid is being heated after the start of a dispensing operation), the control circuit 16 may cause the pump 112 to deliver additional liquid to the tank 118 so that the tank 118 is filled to a suitable level to dispense a beverage volume equal to the adjusted volume. If the user decreases the beverage volume, the control circuit 16 may operate the air pump 121 so that liquid delivery stops before the liquid level reaches the level of the outlet 118*a*. A conductive probe 123 or other sensor, or a run time of the air pump 121 may be used to determine that a suitable volume equal to the adjusted volume has been delivered from the tank 118 in the case of a user decreased beverage volume. If the user increases or decreases the beverage volume while liquid is being delivered from the tank 118 to the brew chamber 15, the control circuit 16 may use similar techniques to achieve the adjusted beverage volume. For decreased volume selections, the control circuit 16 can stop liquid delivery prior to the liquid level in the tank 118 reaching the outlet 118*a*. For increased volumes, the control circuit 16 can cause the pump 112 to deliver additional liquid to the tank 118, either during dispensing from the tank 118 or after an initial volume of liquid is delivered from the tank 118 more liquid can be delivered by the pump 112 to the tank 118, and then from the tank 118 to the brew chamber 15.

The examples above relate to a user changing a beverage volume during a dispensing operation, but other parameters may be changed instead or, or in addition to, a beverage volume as discussed above. For example, the user interface 14 in the embodiments of FIGS. 1-3 includes a "strength" button 146 that may be pressed by a user to adjust a strength setting of a beverage. Adjusting a "strength" of a beverage may be performed in different ways, such as using additional beverage material to form a beverage than a standard amount, using less water to form a beverage than a standard amount, using a higher water or steam pressure to form a beverage than a standard level (e.g., espresso coffee is made using higher pressure water or steam than drip-type coffee), and others. In this illustrative embodiment, adjusting the "strength" of a coffee beverage is done by adjusting a flow rate of water to the brew chamber: a slower flow rate provides longer contact time between water and coffee grounds, thereby increasing a "strength" of the coffee beverage dispensed. Thus, as part of an automated beverage dispensing operation, such as the formation of a "normal" strength coffee beverage, the control circuit 16 may control the pump 112 to deliver water to the tank 118, and thus the brew chamber 15, at a particular flow rate. If, during the dispensing operation, the user depresses the "strength" button 146, the control circuit 16 may adjust the flow rate of liquid to the brew chamber 15 to be slower than normal, thereby increasing water contact time with the coffee grounds. The flow rate may be slowed in different ways, such as by having the pump continuously deliver water to the brew chamber 15 although at a slower flow rate than normal, or having the pump intermittently deliver water to the brew chamber 15. In some embodiments, the control circuit 16 may slow a water flow rate only while the user depresses the strength button 146, and use a faster flow rate if the user releases the button 146. In other arrangements, a single press and release of the button 146 may cause the control circuit 16 to use a slower or faster flow rate. For example, if the control circuit 16 begins a dispensing operation using a slow flow rate (higher "strength" setting for the beverage), and the user depresses the button 146, the control circuit 16 may switch to a higher flow rate (normal "strength" setting) and use the higher flow rate throughout the remainder of the dispensing operation (subject to another parameter change by the user).

It should be understood that other user input provided via a user interface 14 to adjust other parameters may cause similar adjustment in system control by the control circuit during an automated dispensing operation. If a user presses a button or otherwise provide an increase temperature parameter for the beverage, the control circuit 16 may cause a heating element to operate so as to increase the beverage temperature accordingly. If a user presses a "whipping" button during dispensing, the control system may cause a whipper element to froth or foam a beverage dispensed whereas the whipper element would not have otherwise been used. Other adjustments to system operation under automated control by the control circuit 16 during a dispensing operation may be made in response to user adjusted brew parameters.

While aspects of the invention may be used with any suitable cartridge, or no cartridge at all, some cartridges may include features that enhance the operation of a beverage forming system 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a container 2. As will be understood by those of skill in the art, cartridges in the form of a pod (e.g., having opposed layers of permeable filter paper encapsulating a beverage material) may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage material, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 1 contains a beverage material that is configured for use with a machine that forms coffee and/or tea beverages, however, aspects of the invention are not limited in this respect.

As used herein, "beverage" refers to a liquid substance intended for drinking that is formed when a liquid interacts with a beverage material, or a liquid that is dispensed without interacting with a beverage material. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming system comprising:
   a liquid supply arranged to provide a liquid for forming a beverage, the liquid supply including a pump;
   a brew chamber arranged to hold a beverage material for mixing with the liquid to form a beverage;
   a liquid conditioner arranged to heat or cool the liquid that is provided to the brew chamber;
   a user interface configured to permit a user to adjust a beverage strength setting of the beverage while the beverage is being dispensed from the brew chamber; and
   a control circuit arranged to control the liquid supply and the liquid conditioner to operate automatically according to one or more brew parameters during a dispensing operation to deliver heated or cooled liquid to the brew chamber to form the beverage, wherein the control circuit is configured to control the pump to change a flow rate of liquid to the brew chamber based on user actuation of the user interface to change the beverage strength setting of the beverage while beverage is being dispensed from the brew chamber.

2. The system of claim 1, wherein the user interface is further configured to permit a user to adjust one or more brew parameters including a beverage volume, a temperature of the beverage, an amount of whipping of the beverage, a time period over which the beverage is dispensed, a speed at which the beverage is dispensed, a pressure of liquid delivered to the brew chamber, and an amount of air or steam delivered to purge the brew chamber.

3. The system of claim 1, wherein the control circuit is arranged to control a number of pump revolutions turned by the pump to adjust an amount of liquid delivered to the brew chamber.

4. The system of claim 1, wherein the control circuit is arranged to control a rotary speed of the pump to adjust the flow rate of liquid delivered to the brew chamber.

5. The system of claim 1, wherein the control circuit is arranged to control the pump to operate on an intermittent basis to adjust the flow rate of liquid delivered to the brew chamber.

6. The system of claim 1, wherein the liquid supply includes a storage tank fluidly coupled to an inlet of the pump, and the liquid conditioner includes a heater tank fluidly coupled to an outlet of the pump.

7. The system of claim 6, wherein the pump is a positive displacement pump controllable by the control circuit to deliver a known volume of liquid to the heater tank.

8. The system of claim 6, wherein the brew chamber is arranged to hold a beverage cartridge that contains the beverage material, and an outlet of the heater tank is fluidly coupled to an inlet of the brew chamber to deliver liquid to the beverage cartridge to form a beverage.

9. The system of claim 8, wherein the inlet of the brew chamber includes a piercing element arranged to pierce a portion of the cartridge to form an opening through which liquid is delivered.

10. The system of claim 1, wherein the user interface further comprises a plurality of buttons, each of the plurality of buttons associated with a corresponding beverage volume and being actuatable by a user.

11. The beverage forming system of claim 1, wherein the user interface comprises a strength button configured to permit a user to adjust the beverage strength setting of the beverage, and wherein the control circuit is configured to control the pump to change the flow rate of liquid to the brew chamber based on user actuation of the strength button.

* * * * *